United States Patent
Kumar et al.

(10) Patent No.: US 11,967,079 B1
(45) Date of Patent: Apr. 23, 2024

(54) SYSTEM AND METHOD FOR AUTOMATICALLY DETECTING LARGE VESSEL OCCLUSION ON A COMPUTATIONAL TOMOGRAPHY ANGIOGRAM

(71) Applicant: Qure.ai Technologies Private Limited, Maharashtra (IN)

(72) Inventors: Shubham Kumar, Bengaluru (IN); Arjun Agarwal, Mumbai (IN); Satish Kumar Golla, Gadwal (IN); Swetha Tanamala, Vijayawada (IN); Preetham Putha, Andhra Pradesh (IN); Sasank Chilamkurthy, Vijayawada (IN); Prashant Warier, Maharashtra (IN)

(73) Assignee: Qure.ai Technologies Private Limited, Mumbai (IN)

( * ) Notice: Subject to any disclaimer, the term of this patent is extended or adjusted under 35 U.S.C. 154(b) by 0 days.

(21) Appl. No.: 18/379,194

(22) Filed: Oct. 12, 2023

(30) Foreign Application Priority Data

Feb. 3, 2023 (IN) .............................. 202321007170

(51) Int. Cl.
*G06T 7/00* (2017.01)
*G06T 5/50* (2006.01)
(Continued)

(52) U.S. Cl.
CPC .............. *G06T 7/0012* (2013.01); *G06T 5/50* (2013.01); *G06T 7/11* (2017.01); *G06V 10/25* (2022.01);
(Continued)

(58) Field of Classification Search
CPC . G06T 7/0012; G06T 5/50; G06T 7/11; G06T 2207/10081; G06T 2207/20084;
(Continued)

(56) References Cited

U.S. PATENT DOCUMENTS 7,676,257 B2   3/2010   Suryanarayanan et al.
11,751,832 B2  9/2023   Herrmann et al.
(Continued)

OTHER PUBLICATIONS

Shalini A. Amukotuwa et al., Fast Automatic Detection of Large Vessel Occlusions on CT Angiography, Stroke, Nov. 4, 2019, pp. 1-21.

*Primary Examiner* — Siamak Harandi (57) ABSTRACT

The present subject matter discloses a system and method for detecting Large Vessel Occlusion (LVO) on a Computational Tomography Angiogram (CTA) automatically. the system comprises a vascular-territory-segmentation module, an ICV segmentation module, MCA-LVO classifier and ICA-LVO classifier. The vascular territory segmentation module is configured to receive a set of CTA images and to mark a territory of vascular segments in the ICV region for each slice of the ROI. The ICV segmentation module is configured to process each slice of the ROI. The processed slices of the ROI are combined to develop a CTA image after application of MIP and the developed CTA image is segmented into a Middle Cerebral Artery (MCA) region and an Internal Cerebral Artery (ICA) region. The MCA-LVO and ICA-LVO classifiers determine presence of the LVO on the received MCA and ICA region using Deep Learning techniques and accordingly the presence of the LVO is reported.

13 Claims, 6 Drawing Sheets
(5 of 6 Drawing Sheet(s) Filed in Color)

(51) Int. Cl.
*G06T 7/11* (2017.01)
*G06V 10/25* (2022.01)
*G06V 10/764* (2022.01)

(52) U.S. Cl.
CPC .. *G06V 10/764* (2022.01); *G06T 2207/10081* (2013.01); *G06T 2207/20084* (2013.01); *G06T 2207/20221* (2013.01); *G06T 2207/30016* (2013.01); *G06T 2207/30101* (2013.01)

(58) Field of Classification Search
CPC . G06T 2207/20221; G06T 2207/30016; G06T 2207/30101; G06V 10/25; G06V 10/764
See application file for complete search history.

(56) References Cited

U.S. PATENT DOCUMENTS

2022/0101535 A1\* 3/2022 Thamm ................... G06T 7/337
2023/0102246 A1\* 3/2023 Georgescu ............ G06T 7/0012
    382/131

\* cited by examiner

SYSTEM AND METHOD FOR AUTOMATICALLY DETECTING LARGE VESSEL OCCLUSION ON A COMPUTATIONAL TOMOGRAPHY ANGIOGRAM

PRIORITY INFORMATION

The present application does claim a priority from Indian application no. 202321007170 filed on 3 Feb. 2023.

TECHNICAL FIELD

The present subject matter described herein, in general, relates to medical image processing. Particularly, the invention describes a system and a method for detecting Large Vessel Occlusion (LVO) on a Computational Tomography Angiogram (CTA) automatically.

BACKGROUND

In general, a Computed Tomography Angiogram (CTA) is a diagnostic technique that is performed to detect Large Vessel Occlusion (LVO) in a brain. The detection of the LVO in the brain aids to provide treatment for medical conditions such as acute ischemic stroke. Typically, the LVO is caused due to a clot or thrombus that got stuck in arteries. This results in blockage of flow of blood to certain parts of the brain leading to stroke and sometimes death. For this reason, it is critical to detect the presence of LVO in the least possible time. The CTA procedure involves injecting a contrast agent into arteries of anatomy that has to be evaluated for occlusion, however, if the CTA images are not acquired speedily, the injected contrast agents may reach veins, which then leads to an increase in noise level (i.e. due to presence of unwanted veins) in the acquired CTA images. As a result, processing of the CTA images to find the LVO can turn out to be complicated and inaccurate requiring human interventions. Therefore, there is a need for a system and method to detect the LVO automatically in a short duration with precise interpretation.

OBJECTS OF THE INVENTION

Some of the objects of the present disclosure are described herein below:

A main object of the present invention is to provide a system and a method for detecting Large Vessel Occlusion (LVO) on a Computational Tomography Angiogram (CTA) of a brain automatically.

Another object of the present invention is to provide a system and a method for detecting LVO on the CTA of a brain automatically in real time.

Another object of the present invention is to provide a system and a method for detecting LVO on the CTA of a brain using Deep learning models which are fully supervised models that provides analysis result very fast when compared to other existing approaches.

Another object of the present invention is to provide a system and a method for detecting LVO on the CTA of a brain to improve the accuracy of LVO detection and characterization without much human intervention.

Another object of the present invention is to provide a system and a method for detecting LVO on the CTA of a brain to assist in better visualization of the vessels/arteries of the CTA scan in one single image by constructing a MIP that does not have any sort of noise caused by a venous phase due to delayed acquisition.

The other objects and advantages of the present invention will be apparent from the following description when read in conjunction with the accompanying drawings, which are incorporated for illustration of preferred embodiments of the present invention and are not intended to limit the scope thereof.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for detecting Large Vessel Occlusion (LVO) on a Computational Tomography Angiogram (CTA) of a brain. This summary is not intended to identify essential features of the claimed subject matter nor is it intended for use in determining or limiting the scope of the claimed subject matter.

According to an embodiment, the invention provides a system for detecting Large Vessel Occlusion (LVO) on a Computational Tomography Angiogram (CTA) of a brain. The system for detecting the Large Vessel Occlusion (LVO) on the Computational Tomography Angiogram (CTA) comprising a memory and at least one processor. The processor comprises a cranium classifier module, a tilt correcting module, a vascular territory segmentation module, an ICV segmentation module, a MCA-LVO classifier and an ICA-LVO classifier.

The vascular territory segmentation module is configured to receive a set of CTA images. It should be noted that each CTA image is a slice of a region of interest (ROI) comprising a bone region and an Intra Cranial Volume (ICV) region. The vascular territory segmentation module is further configured to mark a territory of vascular segments in the ICV region for each slice of the ROI. The ICV segmentation module is configured to process each slice of the ROI by removing bone regions from each slice of the ROI based on the marked territory of the ICV region using a semantic-segmentation based deep learning approach. Further, the ICV segmentation module removes 'noise artifacts' that may be caused by unwanted veins or capillaries. For a set of CTA images, annotation of the Intra Cranial Volume region of each slice is provided as training data in the semantic-segmentation based deep learning approach. Using this training data, the ICV segmentation module receives a CTA slice as input and provides corresponding ICV without bones as output. Upon removal of the bones, a Maximum Intensity Projection (MIP) is applied on each slice of the ROI. The processed slices of the ROI are combined to develop a CTA image. In an embodiment, the developed CTA image is segmented into a Middle Cerebral Artery (MCA) region and an Internal Cerebral Artery (ICA) region based on the marked territory of the ICV region. Finally, the segmented MCA region and ICA region are sent to a MCA-LVO classifier and an ICA-LVO classifier respectively.

It should be noted that two discreet classifiers, namely, the MCA-LVO classifier, and the ICA-LVO classifier are configured to determine the presence of the LVO on the received MCA region and ICA region respectively using deep learning techniques. Further, the presence of the LVO on the segmented MCA and ICA regions to a user is reported based on the determination by the respective MCA-LVO classifier and ICA-LVO classifier. A training data of the MCA region that is used for training the MCA-LVO classifier is composed of annotated masks of anonymized slices of ROI images. The annotated masks of anonymized slices of ROI images include an Intra Cranial Volume (ICV) data with a Maximum Intensity Projection (MIP), and a MIP of the MCA region with and without veins. The MIP of the MCA region is constructed using ICV segmentation module and Vascular Territory module which make sure that there is no bone and veins present in the MIP. For the MIP of the MCA region, two labels per MIP are annotated, one is binary label used for classification and another one is to mask around occlusion site that is used for segmentation. A training data of the ICA region that is used for training the ICA-LVO classifier is composed of an Internal Carotid Artery (ICA) data with patches of the ICA region. The patches (i.e. small portion of images or regions of the segmented ICA region) of the ICA region are categorized as: a LVO which is a complete occlusion of ICA, a LVO with a calcification, a calcification along with a flow of blood through the ICA, a stenosis and the flow of blood through the ICA. The processor is further configured to validate the annotated masks of the anonymized set of CTA images with recommendations of Radiologists, and update the training data of the MCA region and ICA region with the validated set of CTA images.

It should be noted that the training data of the semantic-segmentation based deep learning approach comprises four-channel inputs in connection to the ICV region. It should be noted that the four channel inputs comprise: a bright window to visualize bones present in the set of CTA images, a medium window to visualize the bones and arteries present in the set of CTA images, a contrast window to visualize the bones, arteries and soft tissues present in the set of CTA images, and a raw data without application of a contrast window. The processor is further configured to recommend a further action to the user based on the determination of the presence of the LVO on the MCA region and the ICA region.

According to another embodiment, the invention provides a system for detecting Large Vessel Occlusion (LVO) on a Computational Tomography Angiogram (CTA) automatically using deep learning techniques. The system comprises memory and at least one processor. The processor comprises a cranium classifier module, a tilt correcting module, a vascular territory segmentation module, an ICV segmentation module, a MCA-LVO region classifier and an ICA-LVO region classifier. The vascular territory segmentation module is configured to receive a set of CTA images. It should be noted that each CTA image is a slice of a region of interest (ROI) comprising a bone region and an intracranial volume (ICV) region. The vascular territory segmentation module is further configured to mark a territory of vascular segments in the ICV region for each slice of the ROI.

Further, the ICV segmentation module removes noise artifacts that may be caused by unwanted veins or capillaries. Upon removal of the bones, a Maximum Intensity Projection (MIP) is applied on each slice of the ROI. The processed slices of the ROI are combined to develop a CTA image. Further, the developed CTA image is segmented into a Middle Cerebral Artery (MCA) region and an Internal Cerebral Artery (ICA) region based on the marked territory of the ICV region. Further, the developed CTA image is segmented into a Middle Cerebral Artery (MCA) region and an Internal Cerebral Artery (ICA) region based on the marked territory of the ICV. Finally, the segmented ICA region is sent to an ICA-LVO classifier.

It should be noted that the ICA-LVO classifier is configured to determine the presence of the LVO on the received ICA region by comparing the segmented ICA region with training data of the ICA region using the deep learning techniques. It should be noted that the training data (reference data) of the ICA region comprises Internal Carotid Artery (ICA) data with patches of the ICA region. It is to be noted that the patches of the ICA region are small portions of images of the ICA region and/or a small region of right and left side of the segmented ICA region. The ICA-LVO classifier is further configured to report the presence of the LVO on the segmented ICA region to a user based on the determination. Based on the detection of the LVO, the ICA-LVO classifier is trained by utilizing the segmented ICA region in future LVO detections using the deep learning models.

In some embodiments, the processor is further configured to validate the annotated masks of the anonymized set of CTA images with recommendations of Radiologists. Further, the processor is configured to update the training data of the ICA region with the validated set of CTA images. That is, the ICA-LVO classifiers are trained by utilizing the corresponding updated training data in future LVO detections. The updated data of the ICA region with the validated set of CTA images improves the accuracy of the identification of the LVO. It should be noted that the Deep Learning models for detecting the LVO comprise a fully supervised model that includes training data, image processing techniques and Artificial Intelligence (AI) algorithms.

According to another embodiment, the invention provides a method implemented in a system for detecting Large Vessel Occlusion (LVO) on a Computational Tomography Angiogram (CTA) automatically using deep learning techniques. The system comprises a memory and at least one processor. The method comprises receiving a set of CTA images, wherein each CTA image is a slice of a region of interest (ROI) comprising a bone region and an intracranial volume (ICV) region, marking a territory of vascular segments in the ICV region for each slice of the ROI. The method further comprises processing each slice of the ROI by: removing bones and noise artifacts that may be caused by unwanted veins or capillaries from each slice of the ROI based on the marked territory of the ICV region using a semantic-segmentation based deep learning approach. For a set of CTA images, annotation of the Intracranial volume region of each slice is provided as training data in the semantic-segmentation based deep learning approach. Using this training data, the ICV segmentation module receives a CTA slice as input and provides corresponding ICV without bones as output. Upon removal of the bones, a Maximum Intensity Projection (MIP) is applied on each slice of the ROI. The method further comprises combining the processed slices of the ROI to develop a CTA image, segmenting the developed CTA image into a Middle Cerebral Artery (MCA) region and an Internal Cerebral Artery (ICA) region based on the marked territory of the ICV; and sending the segmented MCA region and ICA region to a MCA-LVO classifier and an ICA-LVO classifier respectively. The method further comprises determining presence of the LVO on the received MCA region, and the received ICA region using deep learning techniques, and reporting the presence of the LVO on the segmented MCA and ICA regions to a user based on the determination.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing detailed description of embodiments is better understood when read in conjunction with the appended drawings. For the purpose of illustrating of the present subject matter, an example of construction of the present subject matter is provided as figures, however, the invention is not limited to the specific apparatus, system and a method for detecting and quantifying a plaque/stenosis in a vascular ultrasound scan data as disclosed in the document and the figures.

The present subject matter is described in detail with reference to the accompanying figures In the figures, the left-most digit(s) of a reference number identifies the figure in which the reference number first appears. The same numbers are used throughout the drawings to refer various features of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Some embodiments of this disclosure, illustrating all its features, will now be discussed in detail. The words "determining", "receiving", "processing", "segmenting", "selecting", "applying", "combining", "detecting", "measuring", "marking" and other forms thereof, are intended to be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

As mentioned above, due to delayed acquisition of Computational Tomography Angiogram (CTA) images of a brain portion, injected contrast agents may reach veins and this may lead to an increase in noise artifacts (i.e. caused by unwanted veins and capillaries) in the CTA images during diagnosis. As a result, processing of the CTA images to find Large Vessel Occlusion (LVO) in the brain portion can turn out to be complicated and inaccurate at some instances and may require additional human interventions. For example, a radiologist may have to verify the accuracy of the LVO detection at each stage of processing of the CTA images. Therefore, there is a need for a system to detect LVO on the CTA images automatically. The embodiments herein achieve this by providing a system and a method for detecting LVO on the CTA images automatically using Deep Learning Models. The use of deep learning models aids the Radiologist to detect the LVO in real-time and with greater accuracy leading to more efficient diagnosis. Referring now to the drawings, and more particularly to FIGS. 1 through 7B, where similar reference characters denote corresponding features consistently throughout the figures, there are shown preferred embodiments.

The term "Computational Tomography Angiogram (CTA)" referred herein is an image/scan obtained from a CTA scanning device for monitoring the flow of blood to organs and tissues throughout a body/anatomy of the human. The term "CTA scan data" referred herein is images and the corresponding details of the monitored flow of blood to organs and tissues throughout the body/anatomy of the human.

The term "set of CTA images" referred herein is three-dimensional (3D) scan data of the CTA images. The term "slice of the ROI" referred herein is a two-dimensional (2D) scan data of each slice of the set of CTA images.

The present subject matter discloses a system and a method for detecting a Large Vessel Occlusion in a CTA image automatically using deep learning models. According to aspects of an embodiment, a system and method for detecting a Large Vessel Occlusion in a CTA images automatically using deep learning models is provided to improve the accuracy of a detection of LVO in the brain portion. Particularly, the system provides a solution to detect a Large Vessel Occlusion (LVO) in CTA images automatically in real-time within a short duration. Further, the system utilizes Deep learning models, which are fully supervised to perform the detection of LVO without much human intervention. At each stage of a CTA image processing, a set of training data is used from memory for further processing the set of CTA images using the deep learning models. The training data is validated by Radiologist or skilled person in the art. The training data is also updated based on the determination of the presence of the LVO in the CTA image. The updated data of the ICA region with the validated set of CTA images improves the accuracy of the identification of the LVO. It should be noted that the Deep Learning models for detecting the LVO comprise a fully supervised model that includes a training data, image processing techniques and Artificial intelligence (AI) algorithms. The Deep Learning models utilize the training data with corresponding annotations that are required for learning.

Initially, the system receives a set of CTA images through an input/output (I/O) interface and identifies a Region of Interest (ROI). Here, each CTA image is a slice of the ROI comprising bone region and an intracranial volume (ICV) region. The ROI is a portion of head that includes an intracranial volume (ICV) region of an anatomy of humans or other mammals. Other regions such as neck, and chest are removed from the set of CTA images. The identified ROI is pre-processed by tilt correction in comparison with reference CTA images. Then, a territory of vascular segments in the pre-processed CTA images are marked. Based on the marked territory of the ICV region, the ICV region is processed by removing bones and unwanted arteries from each slice of the ROI using a semantic-segmentation based deep learning approach.

For a set of CTA images, annotation of the Intracranial volume region of each slice is provided as training data in the semantic-segmentation based deep learning approach. Using this training data, the ICV segmentation module receives a CTA slice as input and provides corresponding ICV without bones as output. Upon removal of the bones and unwanted arteries (veins), a Maximum Intensity Projection (MIP) is applied on each slice of the ROI. The processed slices of the ROI are combined to develop a single CTA image. The single CTA image is a two-dimensional (2D) image of the set of CTA images and the set of CTA images forms a three-dimensional (3D) image of the brain portion. The developed CTA image is segmented into a Middle Cerebral Artery (MCA) region and an Internal Cerebral Artery (ICA) region based on the marked territory of the ICV. Based on the segmented MCA region and ICA region of the CTA image, the presence of the LVO is detected separately for the MCA region and the ICA region. Finally, based on the determination, the presence of the LVO on the segmented MCA and ICA regions is reported to a user. With the figure description, the details regarding the automatic LVO detection in the CTA images are further explained.

Figure 1:
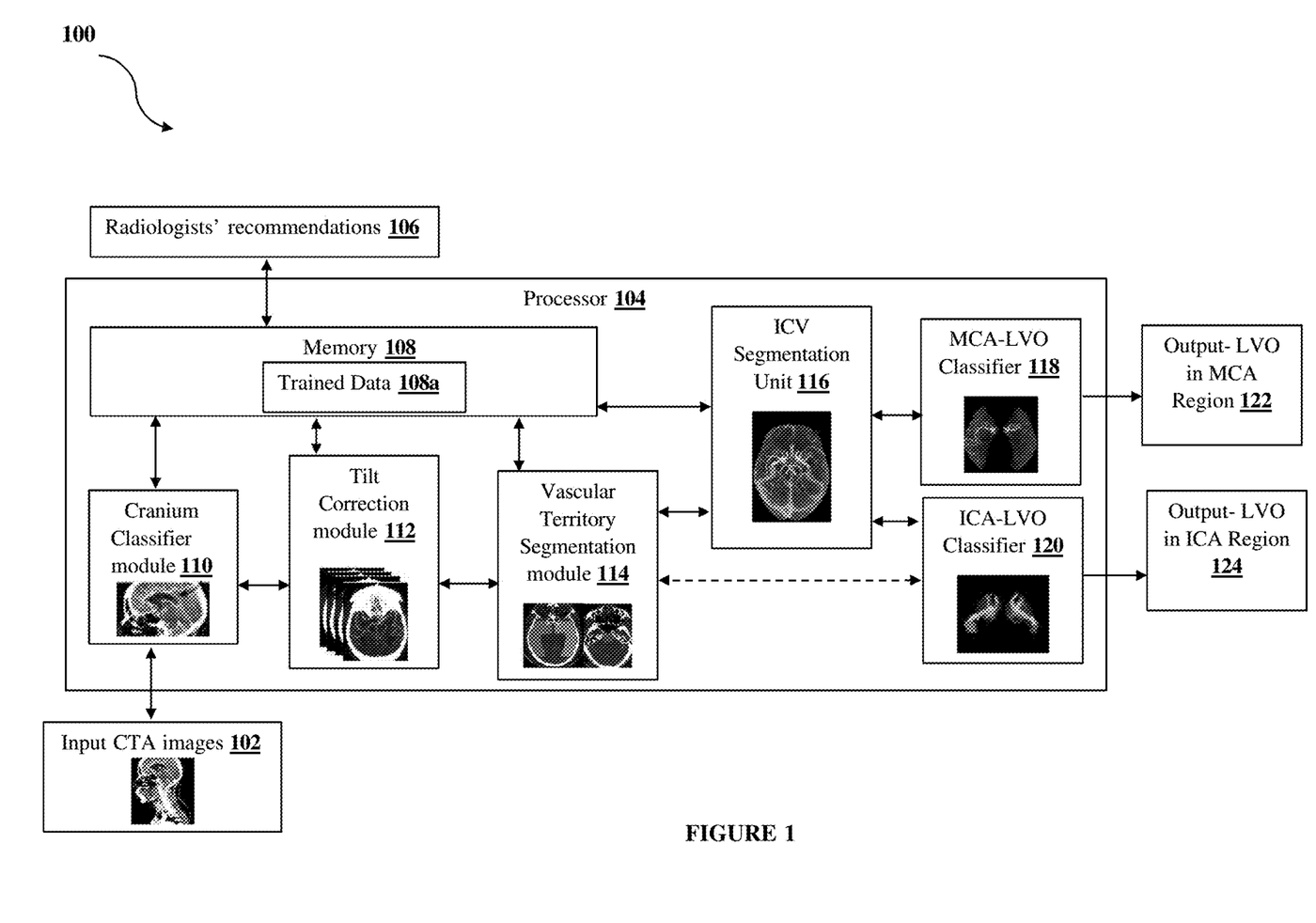
FIG. 1 illustrates a schematic block diagram of a system for detecting Large Vessel Occlusion (LVO) on a Computational Tomography Angiogram (CTA) of a brain, in accordance with an embodiment of the present subject matter.

Referring now to FIG. 1, a schematic block diagram of a system 100 for detecting Large Vessel Occlusion (LVO) on a Computational Tomography Angiogram (CTA) automatically is illustrated. The system comprises a memory 108 and at least one processor 104. The processor 104 comprises a cranium classifier module 110, a tilt correcting module 112, a vascular territory segmentation module 114, an ICV segmentation module 116, a MCA-LVO classifier 118 and an ICA-LVO classifier 120.

The cranium classifier module 110 is configured to identify a Region of Interest (ROI) from a received set of CTA images by removing a portion of images relating to the neck and chest region. For example, the set of CTA images may include three-dimensional (3D) CTA images of the head and torso of a human or other mammal. The 3D CTA images include several slices of the CTA image in 2D format. The cranium classifier module 110 comprises a Convolutional Neural Network (CNN) based binary classification model for identifying the ROI from a received set of CTA images by removing a portion of images relating to the neck and chest region. The cranium classifier module 110 is further configured to classify the identified ROI acceptable for vascular territory segmentation based on CTA parameters of brain images prior to marking the territory of the vascular segments.

It should be noted that the CTA parameters include but are not limited to an axial orientation of the set of the CTA images, a slice thickness of the set of the CTA images, a height of a cranium, and a kilovoltage peak (KVP) range of the set of the CTA images. For example, the cranium classifier can filter only brain images with axial orientation and the slice thickness should be less than or equal to 1 mm. In addition, the cranium classifier can filter the set of CTA images to have at least 10 mm height of a cranium. Further, the cranium classifier can filter images for a specific KVP range. The KVP details for the set of CTA images are usually present in Digital Imaging and Communications in Medicine (DICOM) metadata. The detailed description of the identification of the ROI of the set of CTA images is described in connection with FIG. 2.

According to an embodiment, the tilt correction module 112 is configured to correct orientation of the identified ROI based on a reference set of CTA images, prior to marking the territory of the vascular segments. The reference set of CTA images is stored as training data in the memory. It should be noted that the reference set of CTA images is bilaterally symmetric with respect to a vertical axis. The detailed description of the tilt correction of the set of CTA images is described in connection with a FIG. 3.

According to an embodiment, the vascular territory segmentation module 114 is configured to receive a set of CTA images. It should be noted that each CTA image is a slice of a Region of Interest (ROI) comprising a bone region and an Intra Cranial Volume (ICV) region. The vascular territory segmentation module is further configured to mark a territory of vascular segments in the ICV region for each slice of the ROI. The vascular territory segmentation module is configured to mark a territory of vascular segments in the ICV region for each slice of the ROI using an Atlas segmentation model. The Atlas segmentation model is configured to identify anatomical segments of the brain using a deep learning model/algorithm. The detailed description of the marking of vascular territories in a set of CTA images is explained in connection with FIG. 4.

According to an embodiment, the ICV segmentation module 116 is configured to process each slice of the ROI by removing bones and noise (i.e. other unwanted veins/arteries/capillaries) from each slice of the ROI based on the marked territory of the ICV region using a semantic-segmentation based deep learning approach. For instance, if the acquisition of the CTA images is delayed, then contrast agents used for acquiring the CTA images can spread to other veins and capillaries. This is referred to as "noise artifacts" caused by veins or capillaries that are not needed for the diagnosis. The process of removal of bones and noise artifacts prevents errors while detecting the LVO using the Deep Learning Models. For a set of CTA images, annotation of the Intracranial volume region of each slice is provided as training data in the semantic-segmentation based deep learning approach.

Figure 5A:
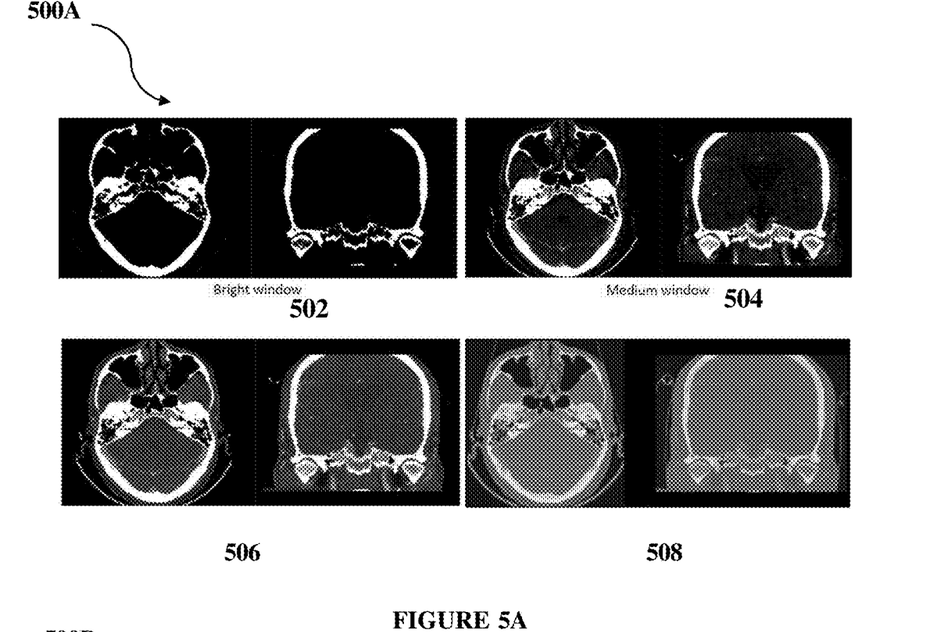
FIG. 5A illustrates input channel filters for the ICV segmentation, in accordance with an embodiment of the present subject matter.

Using this training data, the ICV segmentation module receives a CTA slice as input and provides corresponding ICV without bones as output. The semantic-segmentation based deep learning approach is implemented by applying mask over each slice of the ROI to remove the bones and to keep only arteries and soft tissues. The masks are developed from four-channel inputs in connection to the intracranial volume (ICV) region. For example, in convolutional neural networks (CNNs) Input to the model is H*W*C, where H is the height of the image, W is the width of the image and C is the number of channels, For RGB image C=3 to represent all 3 channels of image i.e., R, G, B. Here, the CTA images are in grayscale. So, the contrast and brightness of an image can be changed by manipulating its window width and window level, so as to identify different pathologies. For the ICV segmentation model as well as the vascular territory model the input is provided as 512*512*4, where 4 represents the four channel inputs. The four channel inputs of the ICV region segments comprises a bright window to visualize bones present in the set of CTA images, a medium window to visualize the bones and arteries present in the set of CTA images, a contrast window to visualize the bones, arteries and soft tissues present in the set of CTA images, and a raw data without application of a contrast window. The detailed description of the four channel inputs in connection to the ICV region segments is described in connection with the FIG. 5.

The ICV segmentation module 116 is configured to process each slice of the ROI by applying a Maximum Intensity Projection (MIP) on each slice of the ROI, upon removal of the bones. Further, the ICV segmentation module is configured to process each slice of the ROI by combining the processed slices of the ROI to develop a CTA image, after the application of MIP on each slice of the ROI. For example, in a slice of an ROI image, the arteries are visible as small dots. After applying MIP on each slice of the ROI, the slices of the ROI image show connected arteries to visualize a proper flow of blood in blood vessels. If there is any LVO or blockage present in the arteries, the processed slices of ROI image in 3D format will not show the connected arteries indicating that there might be a blockage of the flow of blood to the arteries.

After combining the processed slices of the ROI, the developed CTA image is segmented into a Middle Cerebral Artery (MCA) region and an Internal Cerebral Artery (ICA) region based on the marked territory of the ICV. The segmented MCA region and ICA region are sent to the MCA-LVO classifier 118 and the ICA-LVO classifier 120 respectively. An exemplary segmented MCA region and ICA region of the set of CTA images is described in connection with FIGS. 5A-5D.

It should be noted that two discreet classifiers, namely, the MCA-LVO classifier and ICA-LVO classifier are configured to determine the presence of the LVO on the received MCA region and ICA region respectively using deep learning techniques. By the two discreet classifiers, decisions can be taken quickly for detecting whether the LVO is present in the MCA region or the ICA region. It should be noted that the MCA-LVO classifier 118 is configured to determine the presence of the LVO on the received MCA region by comparing the segmented MCA region with training data of the MCA region using deep learning techniques. The training data of the MCA region that is used for training the MCA-LVO classifier is composed of annotated masks of anonymized slices of ROI images. The annotated masks of anonymized slices of the ROI images include Intra Cranial Volume (ICV) data with a Maximum Intensity Projection (MIP), and a MIP of the MCA region with and without veins. The MIP of the MCA region is constructed using an ICV segmentation module and Vascular Territory module which make sure that there is no bone and veins present in the MIP. For the MIP of the MCA region, two labels per MIP are annotated, one is a binary label used for classification and another one is to mask around an occlusion site that is used for segmentation. Based on the detection of the LVO, the MCA-LVO classifier is trained by utilizing the segmented MCA region in future LVO detections using the Deep Learning models. The MCA LVO classifier also provides a bounding round box around the occlusion site to assist detection of the occlusion.

The ICA-LVO classifier 120 is configured to determine the presence of the LVO on the received ICA region by comparing the segmented ICA region with training data of the ICA region using the deep learning techniques. The training data of the ICA region that is used for training the ICA-LVO classifier is composed of Internal Carotid Artery (ICA) data with patches of the ICA region. The training data for the ICA-LVO classifier includes patches of dimension 64*64 where each patch is formed by cropping/segmenting the ICA region from the CTA slice provided by the vascular territory segmentation model. It should be noted that the patches of the ICA region are small portions of images of the ICA region and/or a small region of the right and left side of the segmented ICA region. The patches of the ICA region are categorized as the LVO which is a complete occlusion of ICA (or ICA region), a LVO with a calcification, a calcification along with a flow of blood through the ICA, a stenosis and the flow of blood through the ICA.

For instance, if a patient actually has the LVO on the ICA region (it can be either right or left) of his brain, then training the data of one of the patches of ICA to identify the occlusion. That is, a patch or small region of the segmented image is trained to obtain the training data. With the obtained training data, further training is performed on the remaining patches of the ICA region to identify the presence/absence of the occlusion. For example, if 65 CTA slices are received for diagnosis, then from that 130 patches of ICA region are generated (that is each CTA slice have two ICA patch one for left and the other for right ICA). The 130 patches of the ICA region are fed to the ICA classifier to identify the presence/absence of the occlusion using the training data obtained for the single patch of the ICA region. A training data collection and comparison of segmented MCA region and ICA region of the set of CTA images are described in connection with FIGS. 5A-5D.

The presence of the LVO on the segmented MCA and ICA regions is reported to a user based on the determination by the respective MCA-LVO classifier and the ICA-LVO classifier. The report is provided as an output from the MCA-LVO classifier and/or ICA-LVO classifier. For example, if there is any presence of LVO determined in the MCA region, the presence of the LVO on the segmented MCA region along with a length of the LVO, a thickness of the LVO and so on. In some embodiments, the processor is further configured to recommend a further action to the user based on the determination of the presence of the LVO on the MCA region and the ICA region. Based on the detection of the LVO, the ICA-LVO classifier is trained by utilizing the segmented ICA region in future LVO detections using the deep learning models/techniques.

According to another embodiment, the ICA-LVO classifier is configured to determine presence of the LVO on the marked territory of the ICA region by comparing a patches (i.e. small portion of image) of marked territory of ICA region with a training data of the ICA region using the deep learning techniques. (referring to a dashed line connecting the vascular territory module with the ICA-LVO classifier in FIG. 1)

In some embodiments, the processor is further configured to validate the annotated masks of the anonymized set of CTA images with recommendations of Radiologists 106. Further the processor is configured to update the training data 108*a* of the MCA region and ICA region with the validated set of CTA images. That is, the MCA-LVO classifiers and ICA-LVO classifiers are trained by utilizing the corresponding updated training data in future LVO detections. The updated data of the MCA region and ICA region with the validated set of CTA images improves the accuracy of the identification of the LVO. It should be noted that the Deep Learning models for detecting the LVO comprises a fully supervised model that includes a training data, image processing techniques and Artificial intelligence (AI) algorithms.

Figure 2:
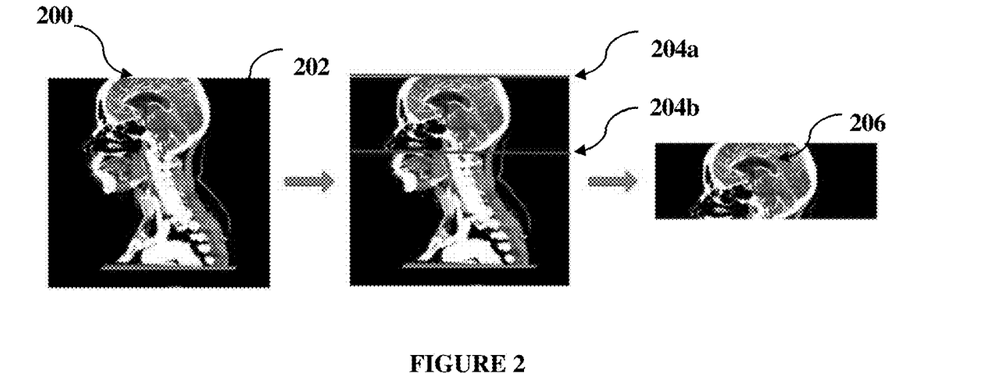
FIG. 2 illustrates an identification of Region of Interest (ROI) of a set of CTA images, in accordance with an embodiment of the present subject matter.

Referring to FIG. 2, an identification of Region of Interest (ROI) 200 of a set of CTA images are illustrated in accordance with an embodiment. The cranium classifier module 110 is configured to identify a Region of Interest (ROI) 206 from a received input of set of CTA images 202 from a user by removing portion of images relating to neck and chest region. The set of CTA images may include a three dimensional (3D) CTA images of the head and torso of a human or other mammal. The 3D CTA images include a several slices of the CTA image in 2D format. For example, in the 3D CTA images, an upper threshold 204*a* and lower threshold 204*b* are determined within the height of a cranium/skull to identify the ROI. The identification of the ROI assists the system to select particularly the slices of the CTA image that includes the intracranial volume (ICV) region/structure.

Figure 3:
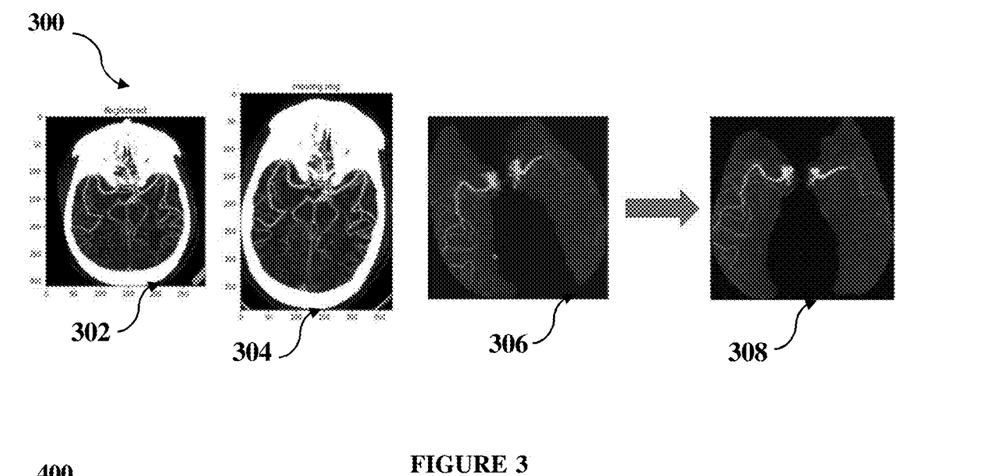
FIG. 3 illustrates a tilt correction of a set of CTA images, in accordance with an embodiment of the present subject matter.

Referring to FIG. 3, a tilt correction 300 of a set of CTA images is illustrated in accordance with an embodiment. For each of the set of CTA images from the cranium classifier, an orientation with respect to a vertical axis is corrected by matching an alignment with a reference 302 set of CTA images. The set of CTA images from the cranium classifier can be a moving image 304 (i.e. video input). After the tilt correction, the orientation of the set of CTA images is symmetrical with respect to the vertical axis. In some cases, the received CTA image may be a moving segmented (or skull-stripped) MCA region 306. The orientation of the segmented MCA region is corrected by matching the alignment with a reference segmented MCA region images. The corrected MCA region 308 is bilaterally symmetrical with respect to the vertical axis.

Figure 4:
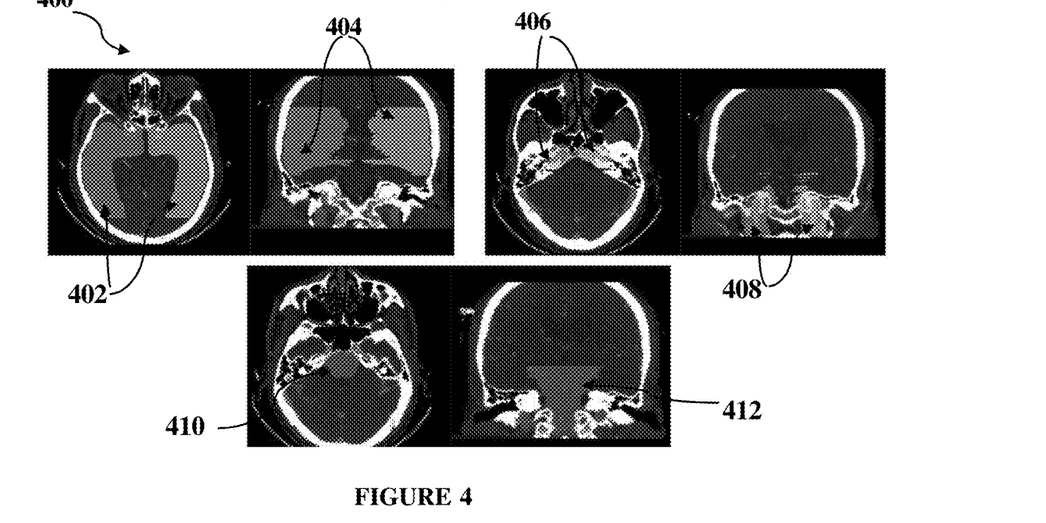
FIG. 4 illustrates a marking of vascular territories in a set of CTA images, in accordance with an embodiment of the present subject matter.

Referring to FIG. 4, a marking of vascular territories 400 in a set of CTA images is illustrated in accordance with an embodiment. The vascular territory segmentation module is configured to mark a territory of vascular segments in the ICV region for each slice of the ROI using an Atlas segmentation model. The Atlas segmentation model is configured to identify anatomical segments of the brain using Deep Learning model/algorithm. The territory for Middle Cerebral Arteries (MCA) region (402, 404) in the ICV region for each slice of the ROI is marked using superior and posterior views of the brain. Further, the territory for the ICA region (406, 408) in the ICV region for each slice of the ROI is marked using a horizontal section of the superior view and a vertical section of the posterior view of the brain. Furthermore, the territory of the Internal Cerebral Artery (ICA) region (410, 412) in the ICV region for each slice of the ROI is marked using the horizontal section of the superior view and the vertical section of the posterior view of the brain.

For marking the territory of the ICA region, initially a Neurologist annotate the territory of ICA region (410, 412) on the brain's left and right side in a single CTA scan. Using this as reference, a territory of the ICA region on further CTA scans is annotated. These annotated CTA scans were used to further train and to validate the vascular territory segmentation module. The vascular territory segmentation module provides a plurality of ICA territory mask to mark the territory of vascular segments in the ICA region for each slice of the ROI. A Dice Similarity Coefficient (DSC) was adopted to validate the output of the vascular territory segmentation module. For example, the ICA territory masks were validated on 232 CTA scans with a DSC value of 0.90 approximately.

Referring to FIG. 5A, input channel filters 500*a* for ICV segmentation are illustrated in accordance with an embodiment. The Intracranial volume (ICV) segmentation is performed for removing bones and 'noise artifacts' using the deep learning models. The deep learning models utilize training data for bone and noise removal due to unwanted veins or capillaries from the CTA images using four different channel inputs of intracranial volume (ICV) region segments. Depend upon an application of contrast level, the four-channel inputs of the ICV region segments comprise a bright window, a medium window, a contrast window and raw data without the application of a contrast window. The bright window 502 is used to visualize bones present in the set of CTA images both in a superior view and a posterior view. The medium window 504 is used to visualize the bones and arteries present in the set of CTA images both in the superior view, and the posterior view. The contrast window 506 is used to visualize the bones, arteries and soft tissues present in the set of CTA images both in the superior view, and the posterior view. The raw data 508 is the set of CTA images without the application of a contrast window both in the superior view and posterior view.

Figure 5B:
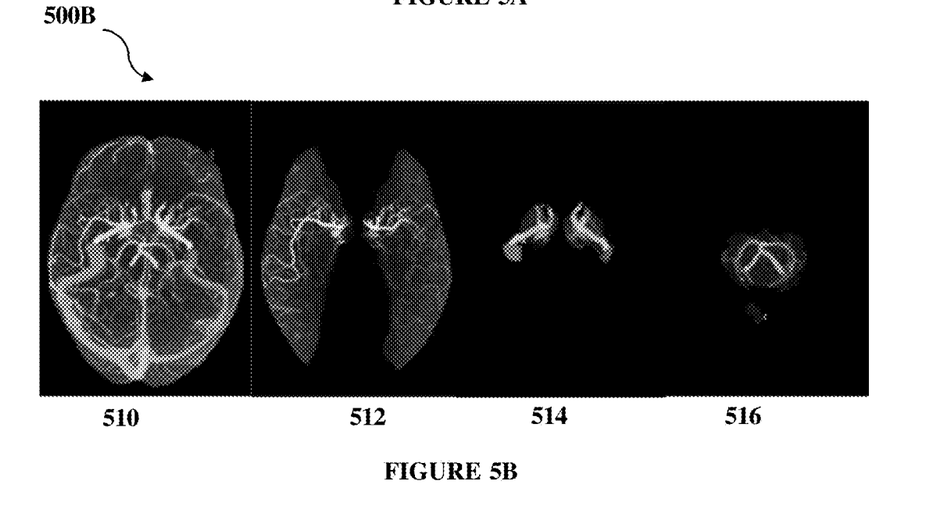
FIG. 5B illustrates exemplary training data for ICV segmentation, in accordance with an embodiment of the present subject matter.

Referring to FIG. 5B, training data 500*b* relating to ICV segmentation is illustrated in accordance with an embodiment. The training data relating to ICV segmentation comprises a developed CTA image 510 in 2D format, a segmented MCA region with M1 and M2 segments 512, and a segmented ICA region.

Figure 5C:
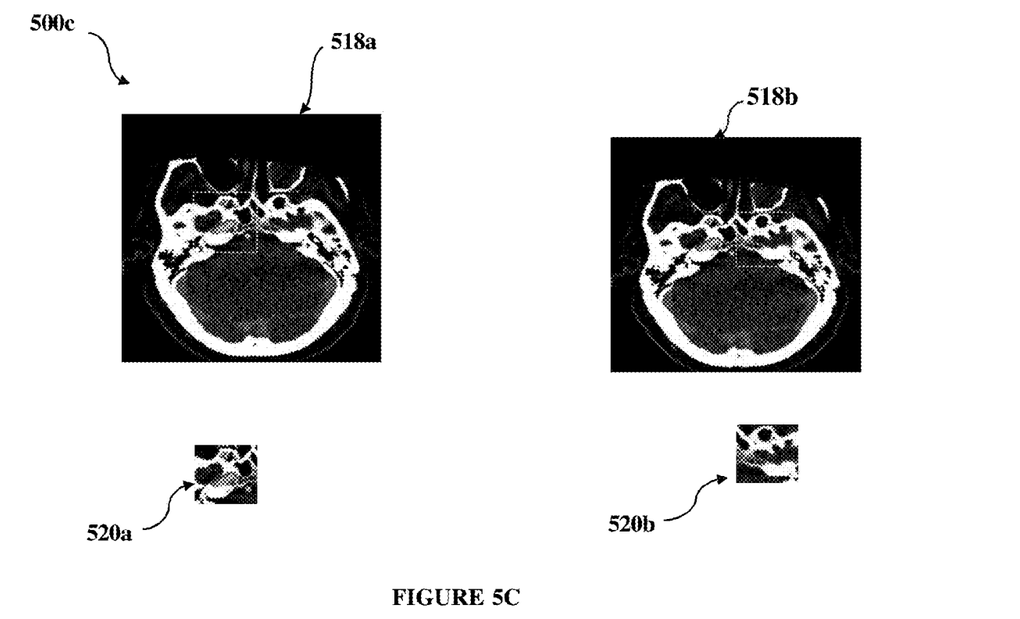
FIG. 5C illustrates an exemplary ICA patch segmentation from the ICA region in an ICV region, in accordance with an embodiment of the present subject matter.

Referring now to FIG. 5C, an exemplary ICA patch segmentation 500c from the ICA region in an ICV region is illustrated, in accordance with an embodiment of the present subject matter. A small portion of ICA patch 520a is segmented from the left side of the ICV region 518a of the brain. Similarly, a small portion of ICA patch 520b is segmented from the left side of the ICV region 518b of the brain. The small portion of the ICA patch may be of a specific dimension that covers the minimal features of the arteries in the ICA region.

Figure 5D:
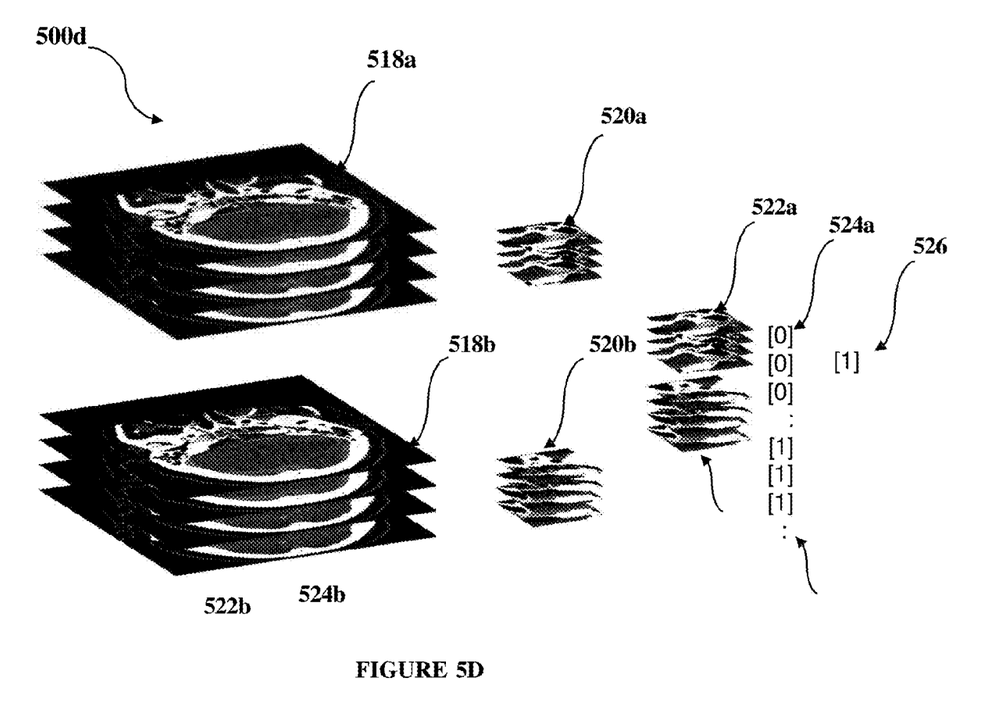
FIG. 5D illustrates another exemplary training data collection for ICV segmentation, in accordance with an embodiment of the present subject matter.

Referring now to FIG. 5D, another exemplary training data collection for ICV segmentation is illustrated, in accordance with an embodiment of the present subject matter. In an example, using the Vascular territory segmentation model, the CTA slices (518a, 518b) that have ICA region are identified. After identification of the ICA region (520a, 520b) in each CTA slice, left and right ICA patches of specific dimensions (for e.g. 64*64) are generated for each ICA slice to develop the training data for the ICA region. Based on the presence/absence of occlusion, a label is given to each left and right ICA patch (522a, 522b) using a Deep Learning technique. Specifically, the ICA-LVO classifier is a CNN-based classification model that is trained to detect the presence of occlusion in a particular ICA patch from the generated ICA patches. In another example, the training data is generated by taking all the left and right ICA patches as input along with respective classification labels to detect the presence/absence of occlusion on the arteries. For instance, an ICA patch volume of 65*64*64 (522a, 522b) is generated for each side of the ICA slices. The ICA patch volumes are concatenated to form a combined patch volume of 130*64*64. While training every 130 ICA patches, the patches have individual ground truth (524a, 524b) as well as one overall ground truth 526 of LVO presence per CTA scan.

An exemplary method 600 implemented in a system for detecting Large Vessel Occlusion (LVO) on a Computational Tomography Angiogram (CTA) of a brain is described with reference to FIG. 6. The method 600 is illustrated as a collection of operations in a logical flow graph representing a sequence of operations that can be implemented in hardware, software, firmware, or a combination thereof. The order in which the method steps are described is not intended to be construed as a limitation, and any number of the described method blocks can be combined in any order to implement the methods or alternate methods. Additionally, individual operations may be deleted from the methods without departing from the scope of the subject matter described herein. In the context of software, the operations represent computer instructions that, when executed by one or more processors, perform the recited operations. Features that are described with reference to FIGS. 1-5 and are not repeated for the sake of brevity.

Figure 6:
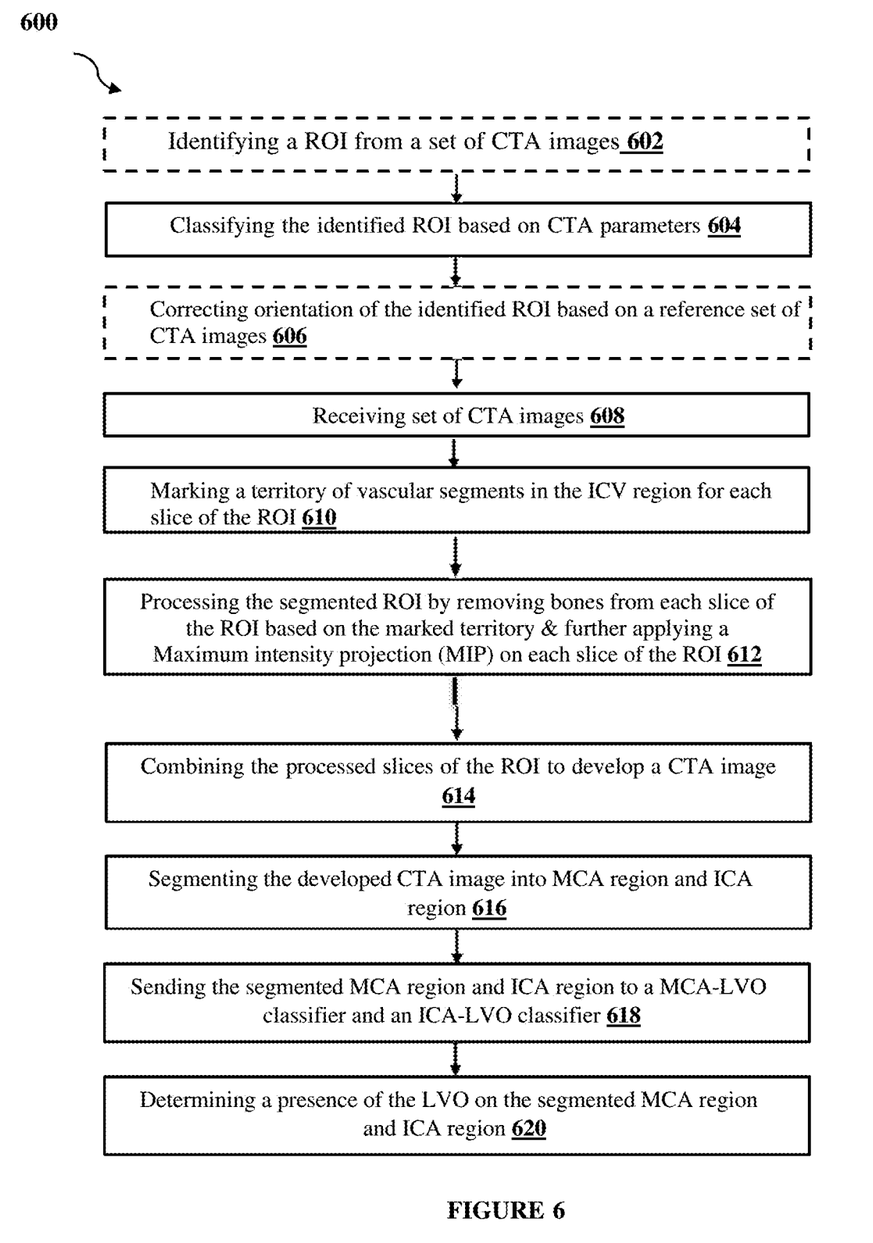
FIG. 6 illustrates an exemplary method for detecting Large Vessel Occlusion (LVO) on a Computational Tomography Angiogram (CTA) of a brain, in accordance with an embodiment of the present subject matter.

Referring now to FIG. 6, a method 600 for detecting Large Vessel Occlusion (LVO) on a Computational Tomography Angiogram (CTA) automatically using deep learning techniques. The method 600 can be implemented in a system comprising a memory and at least one processor. The method comprises the steps:

At block 602, the Region of Interest (ROI) is identified from the received set of CTA images by removing portion of images relating to neck and chest region. For example, the set of CTA images may include three-dimensional (3D) CTA images of the head and torso of a human or other mammal. The 3D CTA images include several slices of the CTA image in 2D format.

At block 604, upon identification of the ROI, the identified ROI is classified based on CTA parameters of brain images prior to marking the territory of the vascular segments. It should be noted that the CTA parameters comprise an axial orientation of the set of the CTA images, a slice thickness of the set of the CTA images, a height of a cranium, a kilovoltage peak (KVP) range of the set of the CTA images. For example, only brain images with axial orientation and a slice thickness of less than or equal to 1 mm are filtered for further processing. In addition, the set of CTA images is filtered to have at least 10 mm height of a cranium. Further, the CTA images are filtered for a specific KVP range. The KVP details for the set of CTA images are usually present in Digital Imaging and Communications in Medicine (DICOM) metadata.

At block 606, an orientation of the identified ROI is corrected based on a reference set of CTA images, prior to marking the territory of the vascular segments. The reference set of CTA images is stored as training data in the memory. It should be noted that the reference set of CTA images is bilaterally symmetric with respect to a vertical axis. From block 602 to 606 represents the pre-processing of the received CTA images.

At block 608, a set of CTA images is received after the pre-processing of CTA images. It should be noted that each CTA image is a slice of a Region of Interest (ROI) comprising bone region and an intracranial volume (ICV) region.

At block 610, a territory of vascular segments in the ICV region is marked for each slice of the ROI. The territory of vascular segments in the ICV region for each slice of the ROI is marked using an Atlas segmentation model.

At block 612, the method further comprises processing each slice of the ROI by: removing bones from each slice of the ROI based on the marked territory of the ICV region using a semantic-segmentation based deep learning approach. Further, a Maximum Intensity Projection (MIP) is applied on each slice of the ROI, upon removal of the bones and noise due to unwanted veins or capillaries. For a set of CTA images, annotation of the Intracranial volume region of each slice is provided as training data in the semantic-segmentation based deep learning approach. Using this training data, the ICV segmentation module receives a CTA slice as input and provides corresponding ICV without bones as output. It should be noted that the semantic-segmentation based deep learning approach is implemented by applying a mask over each slice of the ROI to remove the bones and to keep only arteries and soft tissues. The masks are developed from four-channel inputs in connection to the intracranial volume (ICV) region. The four-channel inputs in connection to the ICV region comprise a bright window to visualize bones present in the set of CTA images, a medium window to visualize the bones and arteries present in the set of CTA images, a contrast window to visualize the bones, arteries and soft tissues present in the set of CTA images, and a raw data without application of a contrast window.

At block 614, the processed slices of the ROI are combined to develop a CTA image. For example, in a slice of ROI image, the arteries are visible as small dots. After applying MIP on each slice of the ROI, the processed slices of ROI image in 3D format provide connected arteries to visualize a proper flow of blood in blood vessels. If there is any LVO or blockage present in the arteries, the processed slices of ROI image in 3D format cannot provide the connected arteries and there might be an abrupt blockage of the flow of blood.

At block 616, the developed CTA image is segmented into a Middle Cerebral Artery (MCA) region and an Internal Cerebral Artery (ICA) region based on the marked territory of the ICV.

At block 618, the segmented MCA region and ICA region is sent to a MCA-LVO classifier and an ICA-LVO classifier respectively.

At block 620, the presence of the LVO is determined on the received MCA region and the received ICA region using deep learning techniques. The presence of the LVO is reported on the segmented MCA and ICA regions to a user based on the determination.

In some embodiments, the method further comprising validating the annotated masks of the anonymized set of CTA images with recommendations of Radiologists; and updating the training data of the MCA region and ICA region with the validated set of CTA images.

According to another embodiment, the present invention provides a computer-readable storage medium, on which a computer program is stored, which when executed by a processor, implements the steps described above in FIG. 6 for detecting a Large Vessel Occlusion (LVO) on a Computational Tomography Angiogram (CTA) automatically. The computer-readable storage medium includes but is not limited to a magnetic disk, an optical disk, a magneto-optical disk, a semiconductor memory, and the like.

Figure 7A:
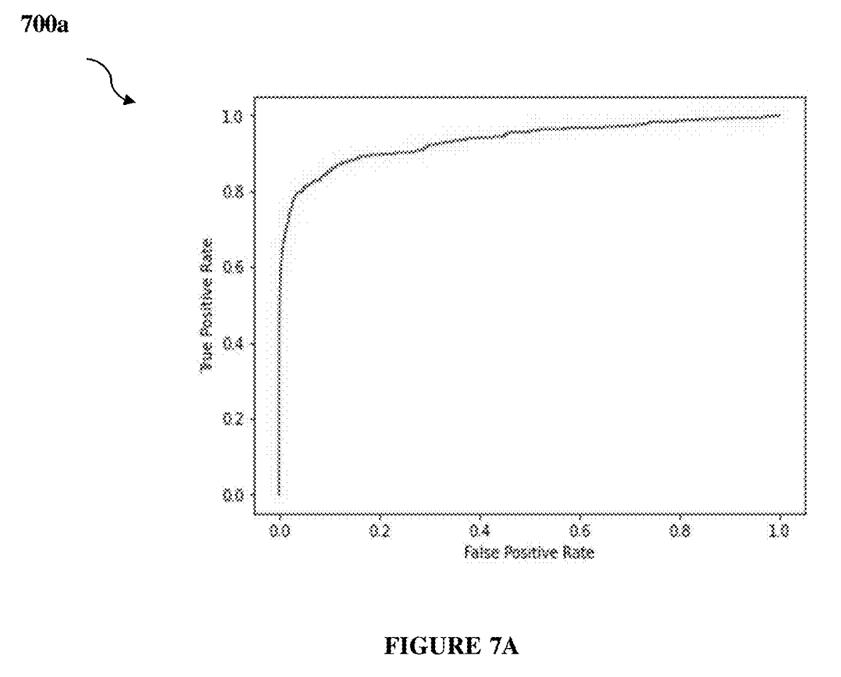
FIGS. 7A and 7B illustrates a graphical representation of simulated results for true positive and false positive rate in MCA-LVO detection and ICA-LVO detection in accordance with an embodiment of the present subject matter.
Figure 7B:
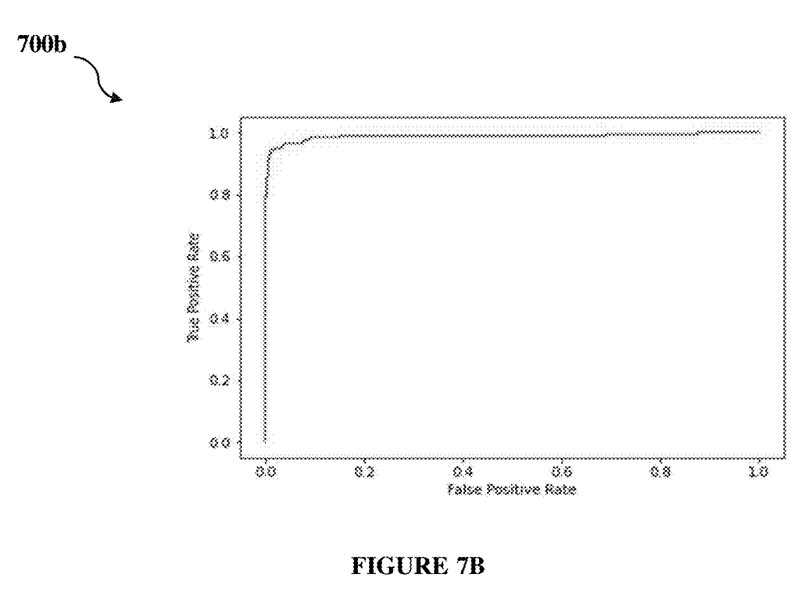

Referring now to FIGS. 7A and 7B, a graphical representation of simulated results for true positive and false positive rates in MCA-LVO detection 700a and ICA-LVO detection 700b are illustrated. Referring to the MCA-LVO detection 700a, simulated results for the true positive rate for the MCA-LVO detection provide a sensitivity of 0.88 and a specificity of 0.91. Referring to the ICA-LVO detection 700b, simulated results for the true positive rate for the ICA-LVO detection provide a sensitivity of 0.96 and a specificity of 0.95. From the result, it is clear that the accuracy in the detection of the MCA-LVO and the ICA-LVO are improved.

Exemplary embodiments discussed above may provide certain advantages. Though not required to practice aspects of the disclosure, these advantages may include those provided by the following features.

Some embodiments of the system and method for detecting LVO on a Computational Tomography Angiogram in the brain scanning automatically can localize the LVO in a shorter time CTA scan and thereby alert and triage critical scans to the Radiologists or Neurologists.

Some embodiments of the system and method for detecting LVO in the CTA of a brain automatically improve the measurement and characterization of the LVO present in the MCA and/or ICA region of the ICV region of brain vascular segments.

Some embodiments of the system and method for detecting LVO in the CTA of a brain automatically can improve the accuracy of measurement of the plaque.

Some embodiments of the system and method for detecting LVO in the CTA of a brain automatically using the Deep learning models can also avoid human intervention. The Deep learning models are fully supervised models, which continuously learn from feedback of a skilled person in the art or Radiologists during processes involved in the ICV segmentation, the MCA-LVO classifier, and the ICA-LVO classifier.

Some embodiments of the system and method for detecting LVO in the CTA images (or CTA) of a brain automatically can reduce the risk of false identification LVO.

Some embodiments of the system and method for detecting LVO in the CTA images of a brain automatically can reduce inter-observer variability and provide more accurate vascular reporting.

Some embodiments of the system and method for detecting LVO in the CTA of a brain automatically can be used by clinicians (who are not specially trained for vascular imaging) without a skill set in medical imaging that can accurately detect LVO in the arteries.

Although implementations for detecting LVO in a set of CTA images automatically have been described in language specific to structural features, it is to be understood that the appended claims are not necessarily limited to the specific features or methods described. Rather, the specific features are disclosed as examples of implementations for detecting LVO in the set of CTA images automatically.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system (100) for detecting Large Vessel Occlusion (LVO) on a Computational Tomography Angiogram (CTA) automatically, wherein the system (100) comprises:
a memory and at least one processor, wherein the processor comprises:
a vascular territory segmentation module configured to:
receive a set of CTA images, wherein each CTA image is a slice of a region of interest (ROI) comprising a bone region and an intracranial volume (ICV) region; and
mark a territory of vascular segments in the ICV region for each slice of the ROI;
an ICV segmentation module configured to process each slice of the ROI by:
removing bones and noise due to veins/capillaries from each slice of the ROI based on the marked territory of the ICV region using a semantic-segmentation based deep learning approach;
upon removal of the bones, applying a Maximum Intensity Projection (MIP) on each slice of the ROI;
combining the processed slices of the ROI to develop a CTA image;
segmenting the developed CTA image into a Middle Cerebral Artery (MCA) region and an Internal Cerebral Artery (ICA) region based on the marked territory of the ICV; and
sending the segmented MCA region and ICA region to a MCA-LVO classifier and an ICA-LVO classifier respectively;
wherein the MCA-LVO classifier is configured to determine presence of the LVO on the received MCA region using deep learning techniques;
wherein the ICA-LVO classifier is configured to determine presence of the LVO on the received ICA region using the deep learning techniques; and report the presence of the LVO on the segmented MCA and ICA regions to a user based on the determination by the respective MCA-LVO classifier and ICA-LVO classifier.

2. The system (100) as claimed in claim 1, wherein the processor further comprises a cranium classifier module configured to:
identify the Region of Interest (ROI) from the received set of CTA images by removing portion of images relating to neck and chest region using a Convolutional Neural Network (CNN) based binary classification model; and
upon identification of the ROI, classify the identified ROI as acceptable for vascular territory segmentation based on CTA parameters of brain images prior to marking the territory of the vascular segments.

3. The system (100) as claimed in claim 1, wherein the CTA parameters comprise an axial orientation of the set of the CTA images, a slice thickness of the set of the CTA images, a height of a cranium, a kilovoltage peak (KVP) range of the set of the CTA images.

4. The system (100) as claimed in claim 1, wherein the processor comprises a tilt correction module configured to correct the axial orientation of the identified ROI based on a reference set of CTA images, prior to marking the territory of the vascular segments.

5. The system (100) as claimed in claim 1, wherein the vascular territory segmentation module is configured to mark a territory of vascular segments in the ICV region for each slice of the ROI using an Atlas segmentation model.

6. The system (100) as claimed in claim 1, wherein the training data of the MCA region that is used for training the MCA-LVO classifier is composed of annotated masks of anonymized slices of ROI images; wherein the annotated masks of anonymized slices include an intracranial volume (ICV) data with a Maximum Intensity Projection (MIP), and a MIP of the MCA region with and without veins.

7. The system (100) as claimed in claim 1, wherein the training data of the ICA region that is used for training the ICA-LVO classifier is composed of an internal Carotid Artery (ICA) data with patches of the ICA region.

8. The system (100) as claimed in claim 1, wherein the patches of the ICA region is categorized as the LVO which is a complete occlusion of ICA, a LVO with a calcification, a calcification along with a flow of blood through the ICA, a stenosis and the flow of blood through the ICA.

9. The system (100) as claimed in claim 1, wherein the processor is further configured to:
validate the annotated masks of the anonymized set of CTA images with recommendations of Radiologists; and
update the training data of the MCA region and ICA region with the validated set of CTA images.

10. The system (100) as claimed in claim 1, wherein the training data of the segmented ROI comprises four-channel inputs in connection to the ICV region;
wherein the four-channel inputs comprise:
a bright window to visualize bones present in the set of CTA images,
a medium window to visualize the bones and arteries present in the set of CTA images,
a contrast window to visualize the bones, arteries and soft tissues present in the set of CTA images, and
a raw data without application of a contrast window.

11. The system (100) as claimed in claim 1, wherein the processor is further configured to recommend further action to the user based on the determination of the presence of the LVO on the MCA region and the ICA region.

12. A system (100) for detecting Large Vessel Occlusion (LVO) on a Computational Tomography Angiogram (CTA) automatically using deep learning techniques, wherein the system (100) comprising:
a memory and at least one processor, wherein the processor comprises:
a vascular territory segmentation module configured to:
receive a set of CTA images, wherein each CTA image is a slice of a region of interest (ROI) comprising a bone region and an intracranial volume (ICV) region, and
mark a territory of vascular segments in the ICV region for each slice of the ROI,
an ICV segmentation module configured to process each slice of the ROI by:
removing bones and noise due to veins/capillaries from each slice of the ROI based on the marked territory of the ICV region using a semantic-segmentation based deep learning approach;
upon removal of the bones, applying a Maximum Intensity Projection (MIP) on each slice of the ROI;
combining the processed slices of the ROI to develop a CTA image;
segmenting the developed CTA image into a Middle Cerebral Artery (MCA) region and an Internal Cerebral Artery (ICA) region based on the marked territory of the ICV; and
sending the segmented ICA region to an ICA-LVO classifier;
wherein the ICA-LVO classifier is configured to determine presence of the LVO on the received ICA region by comparing the segmented ICA region with training data of the ICA region using the deep learning techniques;
wherein the training data of the ICA region that is used for training the ICA-LVO classifier is composed of an Internal Carotid Artery (ICA) data with patches of the ICA region; and
report the presence of the LVO on the segmented ICA region to a user based on the determination by the respective MCA-LVO classifier and ICA-LVO classifier.

13. A method implemented in a system (100) for detecting Large Vessel Occlusion (LVO) on a Computational Tomography Angiogram (CTA) automatically, wherein the system (100) comprising a memory and at least one processor, wherein the method comprising:
receiving a set of CTA images, wherein each CTA image is a slice of a region of interest (ROI) comprising a bone region and an Intra Cranial Volume (ICV) region,
marking a territory of vascular segments in the ICV region for each slice of the ROI, processing each slice of the ROI by:
removing bones and noise due to veins/capillaries from each slice of the ROI based on the marked territory of the ICV region using a semantic-segmentation based deep learning approach;
upon removal of the bones, applying a Maximum Intensity Projection (MIP) on each slice of the ROI;
combining the processed slices of the ROI to develop a CTA image;
segmenting the developed CTA image into a Middle Cerebral Artery (MCA) region and an Internal Cerebral Artery (ICA) region based on the marked territory of the ICV; and sending the segmented MCA region and ICA region to a MCA-LVO classifier and an ICA-LVO classifier respectively;
determining a presence of the LVO on the received MCA region using deep learning techniques;
determining a presence of the LVO on the received ICA region using the deep learning techniques; and
reporting the presence of the LVO on the segmented MCA and ICA regions to a user based on the determination.

* * * * *